United States Patent
Kuroda (10) Patent No.: US 11,055,024 B2
(45) Date of Patent: Jul. 6, 2021

(54) DATA PROCESSING APPARATUS, DATA PROCESSING METHOD, AND DATA PROCESSING PROGRAM

(71) Applicant: Hitachi, Ltd., Tokyo (JP)

(72) Inventor: Yuuki Kuroda, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 157 days.

(21) Appl. No.: 16/538,558

(22) Filed: Aug. 12, 2019

(65) Prior Publication Data

US 2020/0133575 A1 Apr. 30, 2020

(30) Foreign Application Priority Data

Oct. 25, 2018 (JP) .............................. JP2018-201061

(51) Int. Cl.
*G06F 12/00* (2006.01)
*G06F 3/06* (2006.01)

(52) U.S. Cl.
CPC ............ *G06F 3/0659* (2013.01); *G06F 3/067* (2013.01); *G06F 3/0622* (2013.01)

(58) Field of Classification Search
None
See application file for complete search history.

(56) References Cited

U.S. PATENT DOCUMENTS

2011/0197091 A1* 8/2011 Kurasawa ........... G06F 11/0727
714/2
2016/0073315 A1* 3/2016 Kai ........................ H04L 47/24
370/225

FOREIGN PATENT DOCUMENTS

JP H11-065778 A 3/1999

* cited by examiner

*Primary Examiner* — Jason W Blust
(74) *Attorney, Agent, or Firm* — Procopio, Cory, Hargreaves & Savitch LLP (57) ABSTRACT

In a computer which controls data access with respect to a prescribed logical unit, a processor is configured to: perform, when data access by one path with respect to a logical unit is not completed, control for switching paths with respect to the logical unit; perform communication control in accordance with SCSI with the logical unit by executing a SCSI driver; accept a path interchange time that is a time used as a reference for switching paths with respect to the logical unit; determine an upper limit number of retries in data access by the one path on the basis of the path interchange time; and perform control so that an upper limit number of retries using the one path by the SCSI driver equals the determined number of retries.

20 Claims, 9 Drawing Sheets

| Path interchange time (Read) 110a | Path interchange time (Write) 110b | HBA information 110c | Read SCSI timeout time [seconds] 110d | Write SCSI timeout time [seconds] 110e | Applicable LU 110f |
|---|---|---|---|---|---|
| 70 | 70 | HBA0002 | 10 | 20 | LU#1 |
| 90 | 110 | HBA0003 | 20 | 25 | LU#2 |
| 40 | 60 | HBA0001 | 25 | 30 | LU#3 |

| Applicable LU 120a | Read SCSI timeout time [seconds] 120b | Write SCSI timeout time [seconds] 120c | Read SCSI number of retries [times] 120d | Write SCSI number of retries [times] 120e |
|---|---|---|---|---|
| LU#1 | 10 | 20 | 4 | 3 |
| LU#2 | 20 | 25 | 3 | 3 |
| LU#3 | 25 | 30 | 2 | 2 |

| HBA information 130a | Reset timeout time (worst value) [seconds] 130b |
|---|---|
| HBA0001 | 10 |
| HBA0002 | 20 |
| HBA0003 | 30 |
| HBA0004 | 25 |

DATA PROCESSING APPARATUS, DATA PROCESSING METHOD, AND DATA PROCESSING PROGRAM

CROSS-REFERENCE TO PRIOR APPLICATION

This application relates to and claims the benefit of priority from Japanese Patent Application No. 2018-201061 filed on Oct. 25, 2018, the entire disclosure of which is incorporated herein by reference.

The present invention relates to a data processing apparatus and the like for controlling data access with respect to a logical unit.

BACKGROUND

Conventionally, computer systems are known in which a storage apparatus is coupled to a computer via a SAN (Storage Area Network) and a logical unit (a volume) of the storage apparatus can be accessed from the computer.

In such a computer system, when an interface between a computer and a storage apparatus is, for example, a SCSI (Small Computer System Interface), the computer may be configured to access the storage apparatus using a SCSI driver (an OS standard SCSI driver) provided as standard in an OS (Operating system). For example, the OS standard SCSI driver is implemented such that, when the OS standard SCSI driver is unable to access the logical unit, the OS standard SCSI driver retries access within the number of retries (for example, five times) set in advance in a fixed manner.

In addition, in such a computer system, a computer and a logical unit of a storage apparatus are configured to be coupleable by a plurality of paths and, when the logical unit cannot be accessed by a certain path, the logical unit is made accessible by interchanging the path for access with another path.

For example, as a technique related to accessing a hard disk inside a hard disk apparatus, a technique for changing a retry process order and the number of retries in order to enable to process efficiently within an allowable time instructed by a host computer is known (for example, refer to Japanese Patent Application Publication No. H11-65778).

SUMMARY

For example, in a configuration in which a computer and a logical unit of a storage apparatus are coupleable by a plurality of paths, when the computer uses an OS standard SCSI driver to communicate with the storage apparatus, an interchange with another path is performed only after attempts to access for the number of retries set in advance in a fixed manner end in failure. Therefore, there is a risk that a long time maybe required for paths to be interchanged. For example, when there is a fault in a path itself, since an inaccessible state cannot be resolved by performing retries, access may be realized earlier by interchanging paths as compared to repetitively performing retries many times.

For example, while a user may conceivably change the number of retries, actually carrying out the change is difficult when the number of retries cannot be changed in advance such as in the case of an OS standard SCSI driver. To begin with, for many users, it is difficult to determine how big or small the number of retries should be.

The present invention has been made in consideration of the circumstances described above, and an object thereof is to provide a technique that enables the number of retries to be changed and an interchange of paths to be performed in an easy and appropriate manner.

In order to achieve the object described above, a data processing apparatus according to an aspect is a data processing apparatus which includes a processor unit and which controls data access with respect to a prescribed logical unit, wherein the processor unit is configured to: perform, when data access by one path with respect to the logical unit is not completed, control for switching paths with respect to the logical unit; perform communication control in accordance with SCSI with the logical unit by executing a SCSI driver; accept a path interchange time that is a time used as a reference for switching paths with respect to the logical unit; determine an upper limit number of retries in data access by the one path on the basis of the path interchange time; and perform control so that an upper limit number of retries using the one path by the SCSI driver equals the determined number of retries.

According to the present invention, the number of retries can be changed in an easy and appropriate manner and an interchange of paths can be performed in an appropriate manner.

DETAILED DESCRIPTION OF THE EMBODIMENT

An embodiment will be described with reference to the drawings. It should be noted that the embodiment described below is not intended to limit the invention as set forth in the accompanying claims and that all of the elements described in the embodiment and combinations thereof are not necessarily essential to solutions proposed by the invention.

Although information will be described below using expressions such as an "AAA table", information may be expressed using any kind of data structure. In other words, an "AAA table" can also be referred to as "AAA information" in order to show that information is not dependent on data structure.

Furthermore, in the following description, a "processor unit" includes one or more processors. Typically, at least one processor is a microprocessor such as a CPU (Central Processing Unit). Each of the one or more processors may be a single-core processor or a multi-core processor. A processor may include a hardware circuit which performs a part of or all of a process.

In addition, while a "program" is sometimes used as an operating entity when describing a process in the following description, since a program causes a prescribed process to be performed while using at least one of a storage unit and an interface unit as appropriate by being executed by the processor unit, the processor unit (or a computer or a computer system including the processor unit) may be used as a processing entity. The program may be installed to a computer from a program source. The program source may be, for example, a program distribution server or a storage medium that can be read by a computer. In addition, in the following description, two or more programs may be realized as one program or one program may be realized as two or more programs. Furthermore, at least a part of a process realized by executing the program may be realized by a hardware circuit (for example, an ASIC (Application Specific Integrated Circuit) or an FPGA (Field-Programmable Gate Array)).

Figure 1:
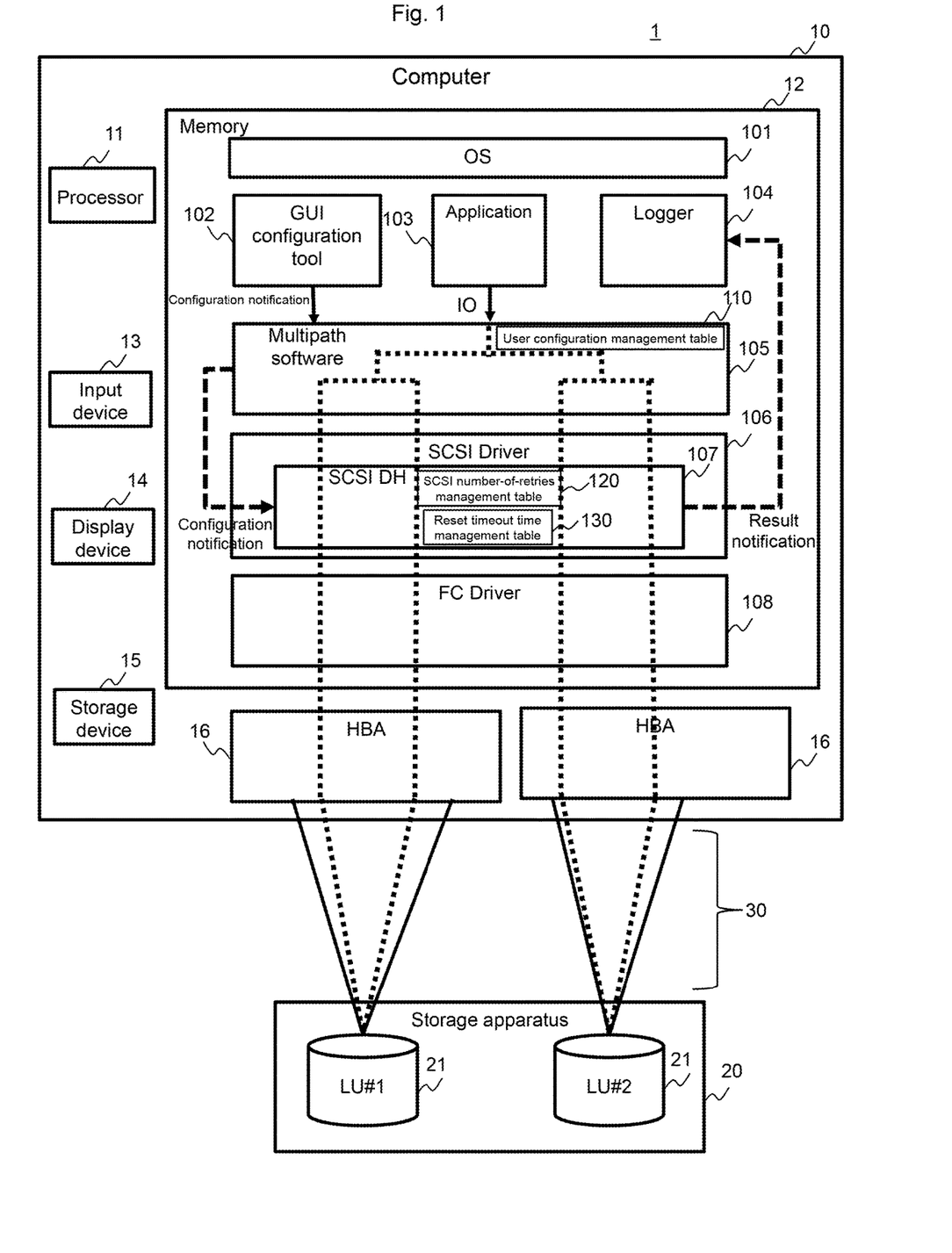
FIG. 1 is an overall configuration diagram of a computer system according to an embodiment.

FIG. 1 is an overall configuration diagram of a computer system according to the embodiment.

The computer system 1 includes a computer 10 as an example of a data processing apparatus and a storage apparatus 20. The computer 10 and the storage apparatus 20 are coupled via a SAN 30. The storage apparatus 20 stores one or more logical units (LUs) 21 storing data to be used by an application 103 on the computer 10.

The computer 10 is constituted by a PC (Personal Computer). The computer 10 includes a processor 11, a memory 12, an input device 13, a display device 14, a storage device 15, and one or more HBAs (Host Bus Adapters) 16.

The input device 13 is a mouse, a keyboard, or the like and accepts an input from a user. The display device 14 is a display apparatus such as a liquid crystal display, for example, and displays and outputs various types of information.

The storage device 15 is a hard disk drive, a flash memory drive, or the like, for example, and stores programs to be executed by the processor 11 and data to be used by the processor 11.

The HBA 16 is an interface for communicating with the storage apparatus 20 and communicates with the storage apparatus 20 via the SAN 30.

The processor 11 executes various processes in accordance with programs stored in the memory 12 and/or the storage device 15.

The memory 12 is a RAM (Random Access Memory) or the like, for example, and stores programs to be executed by the processor 11 and necessary information.

The memory 12 includes, as programs, an OS (Operating system) 101, a GUI configuration tool 102, the application 103, a logger 104, multipath software 105, a SCSI driver 106, a SCSI device handler (SCSI DH) 107, and an FC driver 108.

The OS 101 is Windows (registered trademark), Linux (registered trademark), or the like, for example, and is a program for managing the entire computer 10. The GUI configuration tool 102 is a program which causes a configuration screen 200 to be described later (refer to FIG. 5) to be displayed on the display device 14 and accepts and registers various pieces of configuration information from a user. The application 103 is a program for executing various processes and reads and uses data stored in the logical unit 21 of the storage apparatus 20 and writes a processing result into the logical unit 21.

The logger 104 is a program for causing configuration contents with respect to the SCSI DH 107 to be displayed on the display device 14. The multipath software 105 is a program for managing paths to the logical unit 21 of the storage apparatus 20. The multipath software 105 includes a user configuration management table 110.

The SCSI driver 106 is a program for controlling communication with the storage apparatus 20 in accordance with a SCSI. The SCSI DH 107 is a program which is called and executed by the SCSI driver 106. In the present embodiment, the SCSI DH 107 changes the number of retries of accesses (IOs) by changing a parameter in a command structure used by the SCSI driver 106 to execute a command. The SCSI DH 107 includes a SCSI number-of-retries management table 120 and a reset timeout time management table 130. The FC driver 108 is a program for controlling communication in accordance with the FC (Fiber Channel) protocol.

Figure 2:
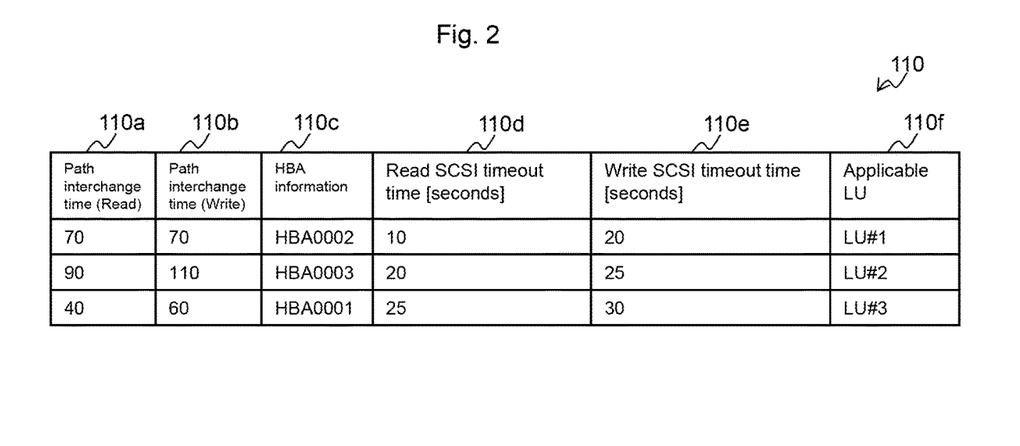
FIG. 2 is a configuration diagram of a user configuration management table according to the embodiment.

Next, the user configuration management table 110 will be described.

FIG. 2 is a configuration diagram of the user configuration management table according to the embodiment.

The user configuration management table 110 is a table for managing configurations by the user related to an access (IO) with respect to each LU, and stores an entry corresponding to each LU.

The entry of the user configuration management table 110 includes fields of a path interchange time (Read) 110a, a path interchange time (Write) 110b, HBA information 110c, a Read SCSI timeout time 110d, a Write SCSI timeout time 110e, and an applicable LU 110f.

The path interchange time (Read) 110a stores a path interchange time (a path interchange time for read) during a read with respect to an LU corresponding to the entry. In this case, the path interchange time indicates an upper limit time for interchanging paths. The path interchange time (Write) 110b stores a path interchange time (a path interchange time for write) during a write with respect to the LU corresponding to the entry. The HBA information 110c stores information (product name or the like: HBA information) for identifying the HBA 16 to be used when accessing the LU corresponding to the entry. The Read SCSI timeout time 110d stores a timeout time (a SCSI T/O value of Read) during a read with respect to the LU corresponding to the entry. The Write SCSI timeout time 110e stores a timeout time (a SCSI T/O value of Write) during a write with respect to the LU corresponding to the entry. The applicable LU 110f stores identification information (an LU number) of the LU corresponding to the entry.

Figure 3:
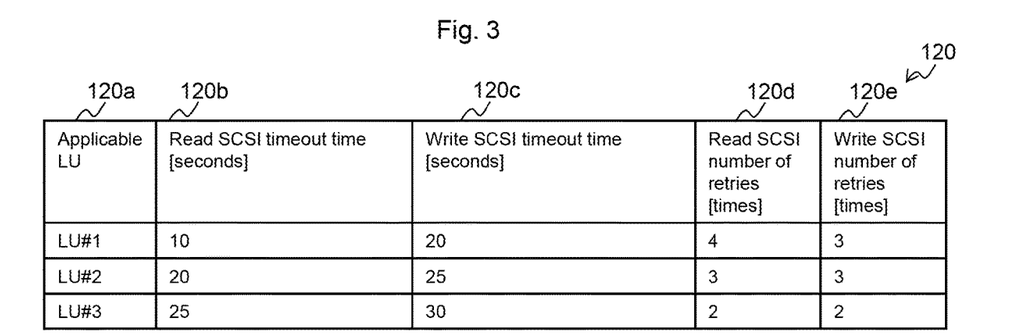
FIG. 3 is a configuration diagram of a SCSI number-of-retries management table according to the embodiment.

Next, the SCSI number-of-retries management table 120 will be described.

FIG. 3 is a configuration diagram of the SCSI number-of-retries management table according to the embodiment.

The SCSI number-of-retries management table 120 is a table for managing the number of retries with respect to each LU, and stores an entry corresponding to each LU.

The entry of the SCSI number-of-retries management table 120 includes fields of an applicable LU 120a, a Read SCSI timeout time 120b, a Write SCSI timeout time 120c, a Read SCSI number of retries 120d, and a Write SCSI number of retries 120e.

The applicable LU 120a stores identification information of an LU corresponding to the entry. The Read SCSI timeout time 120b stores a timeout time (a SCSI T/O value of Read) during a read with respect to the LU corresponding to the entry. The Write SCSI timeout time 120c stores a timeout time (a SCSI T/O value of Write) during a write with respect to the LU corresponding to the entry. The Read SCSI number of retries 120d stores an upper limit number of retries (number of retries during a read) during a read with respect to the LU corresponding to the entry. The Write SCSI number of retries 120e stores an upper limit number of retries (number of retries during a write) during a write with respect to the LU corresponding to the entry.

Figure 4:
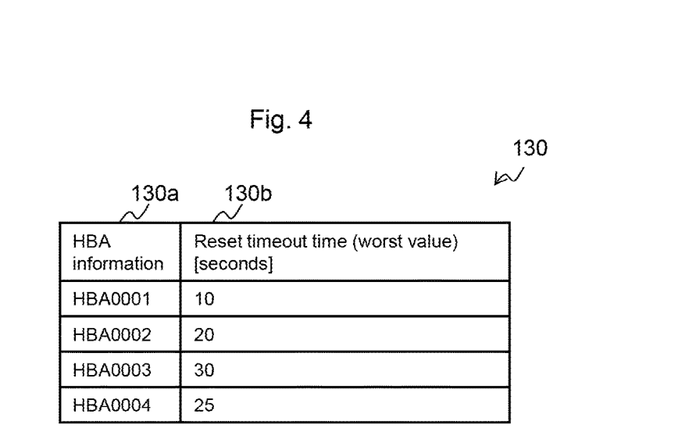
FIG. 4 is a configuration diagram of a reset timeout time management table according to the embodiment.

Next, the reset timeout time management table 130 will be described.

FIG. 4 is a configuration diagram of the reset timeout time management table according to the embodiment.

The reset timeout time management table 130 is a table for managing timeout time during reset of each HBA and stores an entry corresponding to each HBA.

The entry of the reset timeout time management table 130 includes fields of HBA information 130a and a reset timeout time 130b. The HBA information 130a stores identification information (product name or the like, HBA information) of the HBA 16 corresponding to the entry. The reset timeout time 130b stores a worst value (a longest value) of the timeout time during a reset in the HBA 16 corresponding to the entry.

Figure 5:
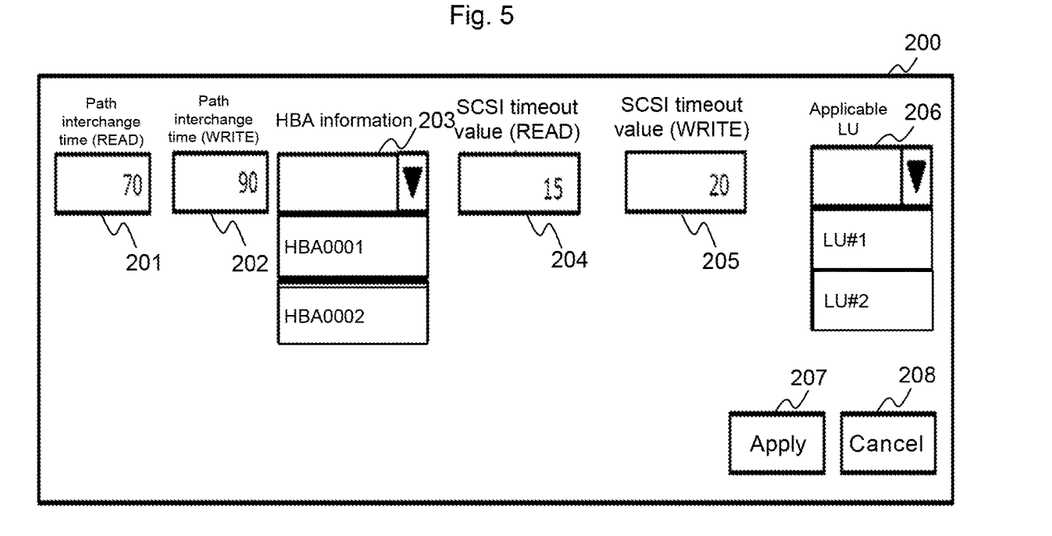
FIG. 5 is a configuration diagram of a configuration screen according to the embodiment.

Next, the configuration screen 200 which is displayed on the display device 14 by the GUI configuration tool 102 will be described.

FIG. 5 is a configuration diagram of the configuration screen according to the embodiment.

The configuration screen 200 has a path interchange time (READ) input area 201, a path interchange time (WRITE) input area 202, an HBA information selection area 203, a SCSI timeout value (READ) input area 204, a SCSI timeout value (WRITE) input area 205, an applicable LU selection area 206, an apply button 207, and a cancel button 208.

The path interchange time (READ) input area 201 is an area for accepting an input of a path interchange time (a path interchange time for read) during a read with respect to an LU (referred to as an applicable LU in the description of FIG. 5) selected in the applicable LU selection area 206. The path interchange time (WRITE) input area 202 is an area for accepting an input of a path interchange time (a path interchange time for write) during a write with respect to the applicable LU. The HBA information selection area 203 is an area for accepting a selection of information (a product name) of the HBA 16 to be used to access the applicable LU. The SCSI timeout value (READ) input area 204 is an area for accepting an input of a timeout value (a SCSI T/O value of Read) during a read with respect to the applicable LU. The SCSI timeout value (WRITE) input area 205 is an area for accepting an input of a timeout value (a SCSI T/O value of Write) during a write with respect to the applicable LU. The applicable LU selection area 206 is an area for accepting a selection of an applicable LU. The apply button 207 is a button for accepting an instruction to apply the configuration input to the configuration screen 200. When the apply button 207 is depressed, the GUI configuration tool 102 notifies the multipath software 105 of the various types of information configured on the configuration screen 200. The cancel button 208 is a button for accepting an instruction to cancel the configuration input to the configuration screen 200.

Figure 6:
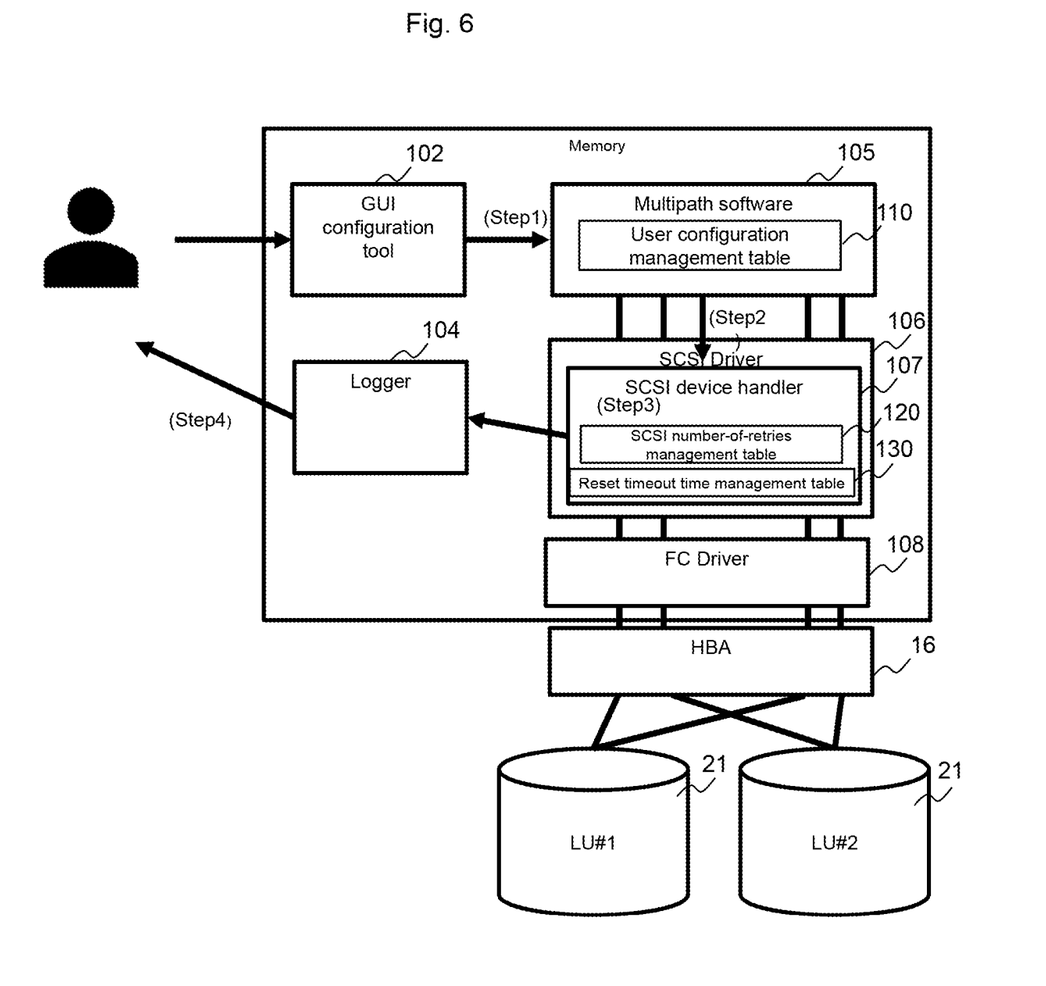
FIG. 6 is a diagram for illustrating a configuration process according to the embodiment.

Next, the configuration process will be described.

FIG. 6 is a diagram for illustrating the configuration process according to the embodiment.

When the GUI configuration tool 102 accepts an instruction for configuration from the user, the GUI configuration tool 102 causes the configuration screen 200 to be displayed on the display device 14 and accepts configuration input from the user. When the apply button 207 is depressed on the configuration screen 200, the GUI configuration tool 102 notifies the multipath software 105 of configuration information (a path interchange time for read, a path interchange time for write, HBA information, a SCSI T/O value for Read, a SCSI T/O value for Write, and an applicable LU) with respect to the configuration screen 200.

The multipath software 105 registers the notified configuration information to the user configuration management table 110. Specifically, when there is an entry corresponding to the applicable LU input to the configuration screen 200 in the user configuration management table 110, the multipath software 105 stores corresponding configuration information input to the configuration screen 200 in the respective fields of the entry, but when there is no entry corresponding to the applicable LU input to the configuration screen 200, the multipath software 105 adds a new entry and stores corresponding configuration information input to the configuration screen 200 in the respective fields of the new entry (Step 1).

Next, the multipath software 105 notifies the SCSI DH 107 of the path interchange time for read, the path interchange time for write, the HBA information, the SCSI T/O value for Read, the SCSI T/O value for Write, and the applicable LU (Step 2).

Based on the various types of information notified from the multipath software 105, the SCSI DH 107 executes a number-of-retries calculation configuration process and notifies the logger 104 of a result thereof (Step 3). Specifically, the SCSI DH 107 acquires a reset timeout time corresponding to the HBA 16 indicated by the HBA information from the reset timeout time management table 130. Next, based on the path interchange time for read, the path interchange time for write, the SCSI T/O value for Read, the SCSI T/O value for Write, and the reset timeout time, the SCSI DH 107 calculates the SCSI number of retries for read and the SCSI number of retries for write, updates the SCSI number-of-retries management table 120 by configuring the calculated SCSI number of retries for read and the SCSI number of retries for write to an entry of the applicable LU, and notifies the logger 104 of a result thereof.

When the logger 104 receives notification of the result from the SCSI DH 107, the logger 104 notifies the user of the result by causing an image including the result to be displayed on the display device (Step 4). Accordingly, the user can comprehend the path interchange times and the numbers of retries during both read and write.

Figure 7:
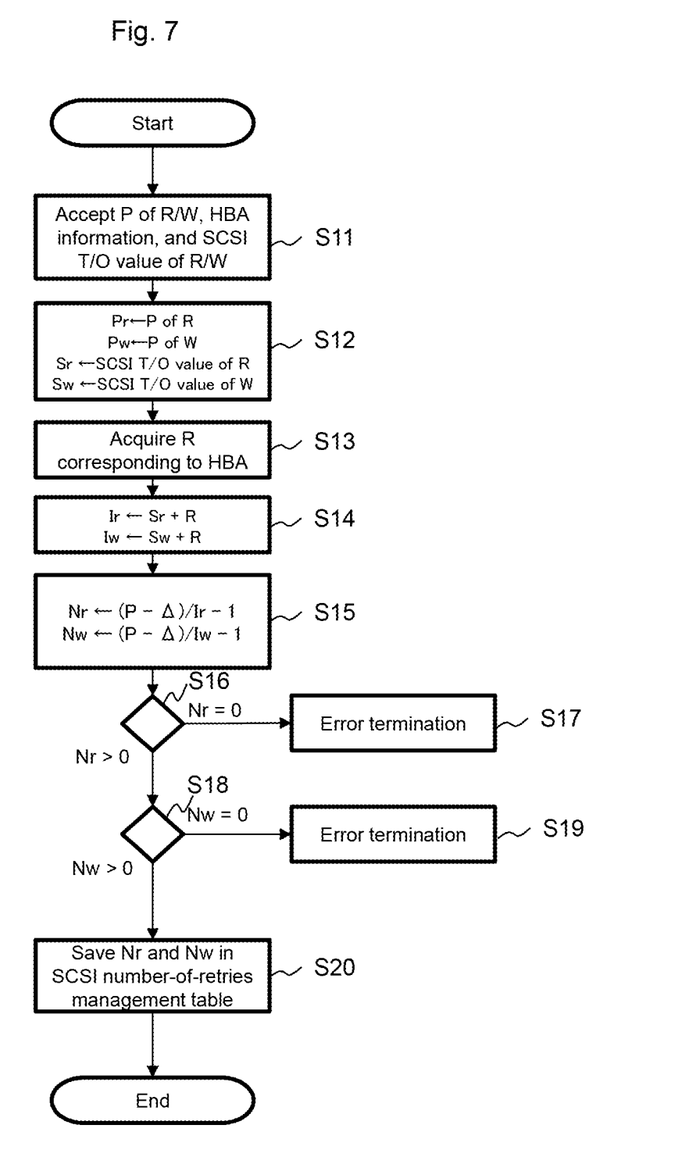
FIG. 7 is a flow chart of a number-of-retries calculation configuration process according to the embodiment.

Next, the number-of-retries calculation configuration process will be described.

FIG. 7 is a flow chart of the number-of-retries calculation configuration process according to the embodiment.

First, the SCSI DH 107 accepts the path interchange times (P) for read and write, the HBA information, and the SCSI T/O values for R/W (read and write) from the multipath software 105 (S11).

Next, the SCSI DH 107 stores the path interchange time (P) for read (R) in a variable Pr, stores the path interchange time (P) for write (W) in a variable Pw, stores the SCSI T/O value for read (R) in a variable Sr, and stores the SCSI T/O value for write (W) in a variable Sw (S12). It should be noted that, during an access, the SCSI driver 106 is to execute a timeout process on the basis of the SCSI T/O value for read (R) and the SCSI T/O value for write (W) configured in the variables Sr and Sw.

Next, the SCSI DH 107 acquires a reset timeout time (R) of the HBA 16 corresponding to the HBA information from the reset timeout time management table 130 (S13).

Next, the SCSI DH 107 calculates Ir according to Sr+R and calculates Iw according to Sw+R (S14). In this case, Ir denotes a response time per 1 IO upon an occurrence of a failure during a read, and Iw denotes a response time per 1 IO upon an occurrence of a failure during a write.

Here, a path interchange time Pt (where t is r or w) may be expressed by the following equation (1).

$$Pt = It*(Nt+1) + \Delta \quad (1).$$

Nt (where t is r or w) denotes the SCSI number of retries and Δ denotes an error time (for example, 0.5 [seconds]) in an IO process. According to equation (1), the SCSI number of retries Nt may be expressed by the following equation (2).

$$Nt = (Pt-\Delta)/It - 1 \quad (2).$$

In equation (2), Nt corresponds to an integer portion after truncating a fractional part of the right side.

On the basis of equation (2), the SCSI DH 107 calculates Nr according to (Pr−Δ)/Ir−1 and calculates Nw according to (Pw−Δ)/Iw−1 (S15).

Next, the SCSI DH 107 determines whether Nr or, in other words, the SCSI number of retries during a read is 0 or larger than 0 (S16). In the present embodiment, as the number of retries, it is considered that at least one retry is necessary both during a read and during a write.

As a result, when Nr is 0 (Nr=0), the SCSI DH 107 concludes that an error has occurred and ends the process (S17). On the other hand, when Nr is larger than 0 (Nr>0), the SCSI DH 107 determines whether Nw is 0 or larger than 0 (S18).

As a result, when Nw is 0 (Nw=0), the SCSI DH 107 concludes that an error has occurred and ends the process (S19). On the other hand, when Nw is larger than 0 (Nw>0), the SCSI DH 107 stores the calculated Nr and Nw in the Read SCSI number of retries 120d and the Write SCSI number of retries 120e of a corresponding entry in the SCSI number-of-retries management table 120 (S20) and ends the process.

According to the number-of-retries calculation configuration process described above, for both during a read and during a write, a SCSI number of retries corresponding to each path interchange time can be readily and suitably calculated and configured. In addition, although a command generally takes more time to complete during a write than during a read, by configuring a SCSI T/O value for each case, the path interchange time during a read can be reduced as compared to a case where a shared SCSI T/O value is used.

Figure 8:
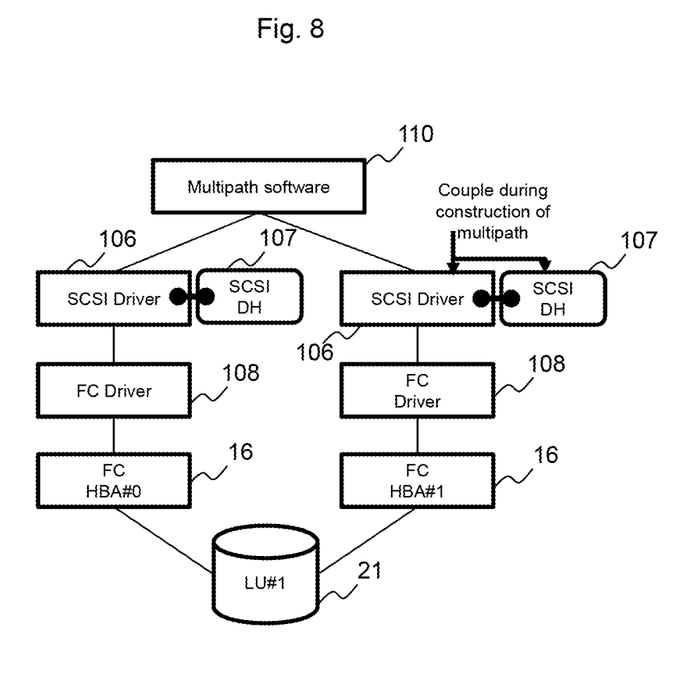
FIG. 8 is a diagram for illustrating a configuration example of a multipath according to the embodiment.
Figure 9:
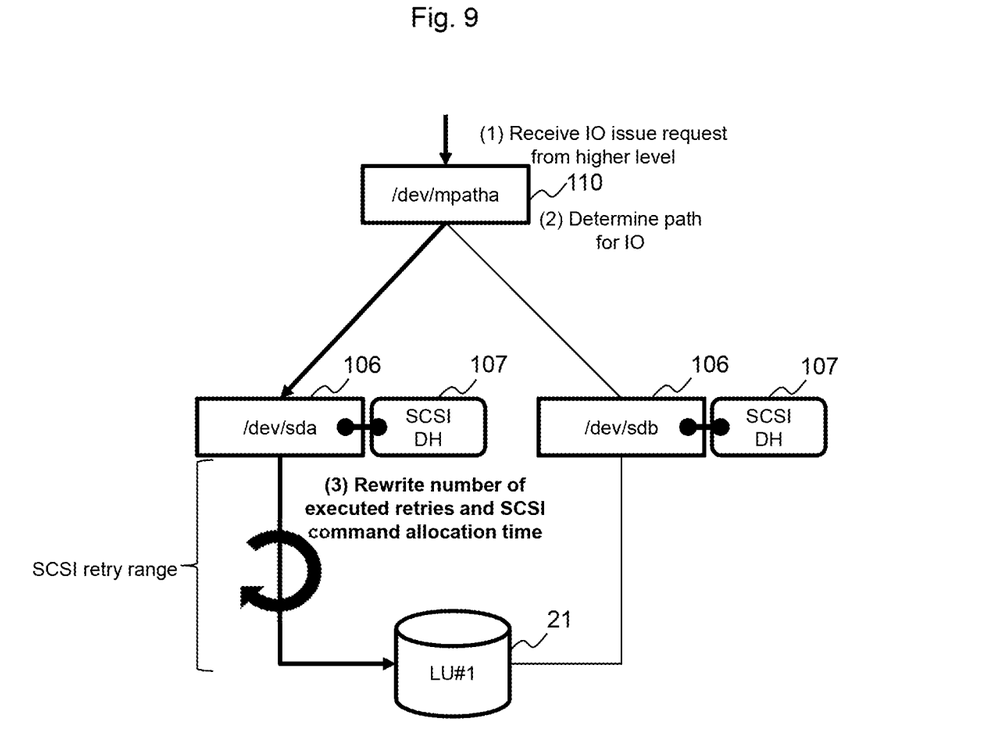
FIG. 9 is a diagram for illustrating an outline of an IO process according to the embodiment.

Next, a configuration example of a multipath and an outline of an IO process will be described.

FIG. 8 is a diagram for illustrating a configuration example of a multipath according to the embodiment. FIG. 9 is a diagram for illustrating an outline of an IO process according to the embodiment.

For example, when configuring a multipath with respect to an LU #1, as shown in FIG. 8, the multipath software 105 determines the SCSI driver 106, the FC driver 108, and the HBA 16 constituting each path and performs configurations related to a coupling relationship among the components of each path. In addition, the multipath software 105 couples the SCSI DH 107 to the SCSI driver 106.

In the configuration example shown in FIG. 8, when an IO issue request is received from a higher level (the application 103), a process is performed as shown in FIG. 9.

Specifically, when an IO issue request is received from a higher level ((1) in FIG. 9), the multipath software 105 determines a path to be used for access from a plurality of paths that enable access to an LU (in the present example, the LU #1) which is an access target ((2) in FIG. 9). The following description assumes that the path on the side of the SCSI driver 106 identified by "/dev/sda" is determined.

Next, the multipath software 105 issues a SCSI command to the SCSI driver 106 of the determined path.

The SCSI driver 106 causes execution of the SCSI DH 107 to start, performs a parameter change process (a change in the number of executed retries and a SCSI command allocation time) related to the command, and causes an upper limit of the number of retries by the SCSI driver 106 to equal the number of retries configured in the SCSI number-of-retries management table 120 ((3) in FIG. 9). The parameter change process will be described later.

Subsequently, the SCSI driver 106 executes an IO to the side of the FC driver 108 in accordance with the parameter. That is, when an access is not normally performed, the SCSI driver 106 causes retries to be performed with the determined number of retries as an upper limit and, once the upper limit number of retries is equaled, the SCSI driver 106 notifies the multipath software 105 of an error. In this case, the multipath software 105 is to perform an access using another path.

Figure 10:
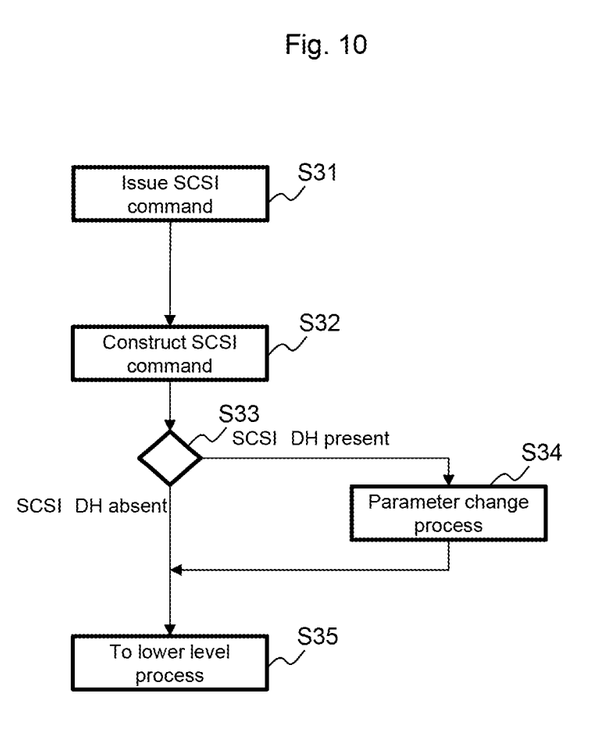
FIG. 10 is a flow chart of an outline of the IO process according to the embodiment.

Next, operations of an IO process will be described.

FIG. 10 is a flow chart of an outline of the IO process according to the embodiment.

When an IO issue request is received from a higher level, the multipath software 105 determines a path to be used for access from a plurality of paths that enable access to an LU that is an access target and issues a SCSI command to the SCSI driver 106 of the determined path (S31).

Next, the SCSI driver 106 constructs a SCSI command structure to store parameters for executing the SCSI command and performing an access (S32) and determines whether or not there is a coupled SCSI DH 107 (S33).

When there is a coupled SCSI DH 107 (SCSI DH present), the SCSI driver 106 causes the SCSI DH 107 to execute a process. Accordingly, the SCSI DH 107 performs a parameter change process for changing parameters of the command structure necessary for executing the command of the SCSI driver 106 (S34).

Here, parameters of the command structure and the parameter change process will now be described.

In the present embodiment, as the parameter change process, a number-of-executed-retries change process and a SCSI command allocation time change process are executed.

First, the number-of-executed-retries change process will be described.

Among the parameters of the command structure, parameters that affect the number of retries include Allowed and Retries.

Allowed indicates a retry upper limit value. In the generic SCSI driver 106, a fixed value (for example, 5) is configured after the SCSI DH 107 is executed. Therefore, even when the value of Allowed is changed by the SCSI DH 107, the changed value does not become the retry upper limit value.

Retries indicates the number of executed retries. The SCSI driver 106 basically repeats retries until the value of Retries equals that of Allowed.

In the present embodiment, with a process of changing the value of Retries (the number-of-executed-retries change process), the SCSI DH 107 causes the upper limit number of retries that are actually executed to equal the number of retries in the SCSI number-of-retries management table 120.

Specifically, in the number-of-executed-retries change process, the SCSI DH 107 executes the process of equation (3) below.

$$\text{Retries} = \max(5-n, 0) \quad (3)$$

Here, max (a, b) denotes a function that outputs a maximum value of a and b. In addition, n denotes the number of retries (the Read SCSI number of retries or the Write SCSI number of retries) in the SCSI number-of-retries management table 120.

According to the process of equation (3), when n is equal to or smaller than 5, 5−n is to be configured for Retries and retries are to be executed until the value of Retries equals the value of Allowed (in this case, 5) or, in other words, n-number of retries are executed. In the present embodiment, a maximum number of retries of 5 is assumed and, when n is equal to or larger than 6, an occurrence of a failure is considered and Retries is set to 0 so that the number of retries equals 5.

Next, the SCSI command allocation time change process will be described.

The SCSI driver 106 may execute a retry when inequality (4) below is not satisfied.

$$\text{Jiffies\_at\_alloc} + \text{timeout} \ast 5 < \text{jiffies} \quad (4)$$

Here, Jiffies_at_alloc (SCSI command allocation time) denotes a time allocated for assembly of a SCSI command after receiving an IO request, timeout denotes a time for monitoring timeout, and jiffies denotes an operating time after receiving the IO request.

Therefore, even in a case where a retry is not performed according to the relationship between Allowed and Retries, when the condition of inequality (4) is not satisfied, a retry may be performed and the number of retries may not equal to the number of retries in the SCSI number-of-retries management table 120.

In consideration thereof, the SCSI DH 107 causes the number of retries to equal the number of retries in the SCSI number-of-retries management table 120 by executing the process (SCSI command allocation time change process) of equation (5) below.

$$\text{Jiffies\_at\_alloc} = \text{Jiffies\_at\_alloc} - (\text{timeout} \ast 5) + \text{timeout} \ast n \quad (5)$$

By performing the process of equation (5), inequality (4) corresponds to inequality (6) below.

$$\text{Jiffies\_at\_alloc} + \text{timeout} \ast n < \text{jiffies} \quad (6)$$

A left side of inequality (6) represents an expectation value of an elapsed time when n-number of retries are performed. Therefore, when n-number of retries are performed, no more retries are to be executed and the n-number of times configured to be executed according to the number-of-executed-retries change process can be the upper limit of the number of retries.

It should be noted that, when the condition of inequality (4) does not exist as an execution condition of a retry in the SCSI driver 106, the SCSI command allocation time change process need not be executed.

When it is determined in step S33 that there is no coupled SCSI DH 107 (SCSI DH absent) or when the process of step S34 is finished, the SCSI driver 106 executes a process (a lower level process) for accessing the LU in accordance with parameters of the command structure and the like (S35).

Figure 11:
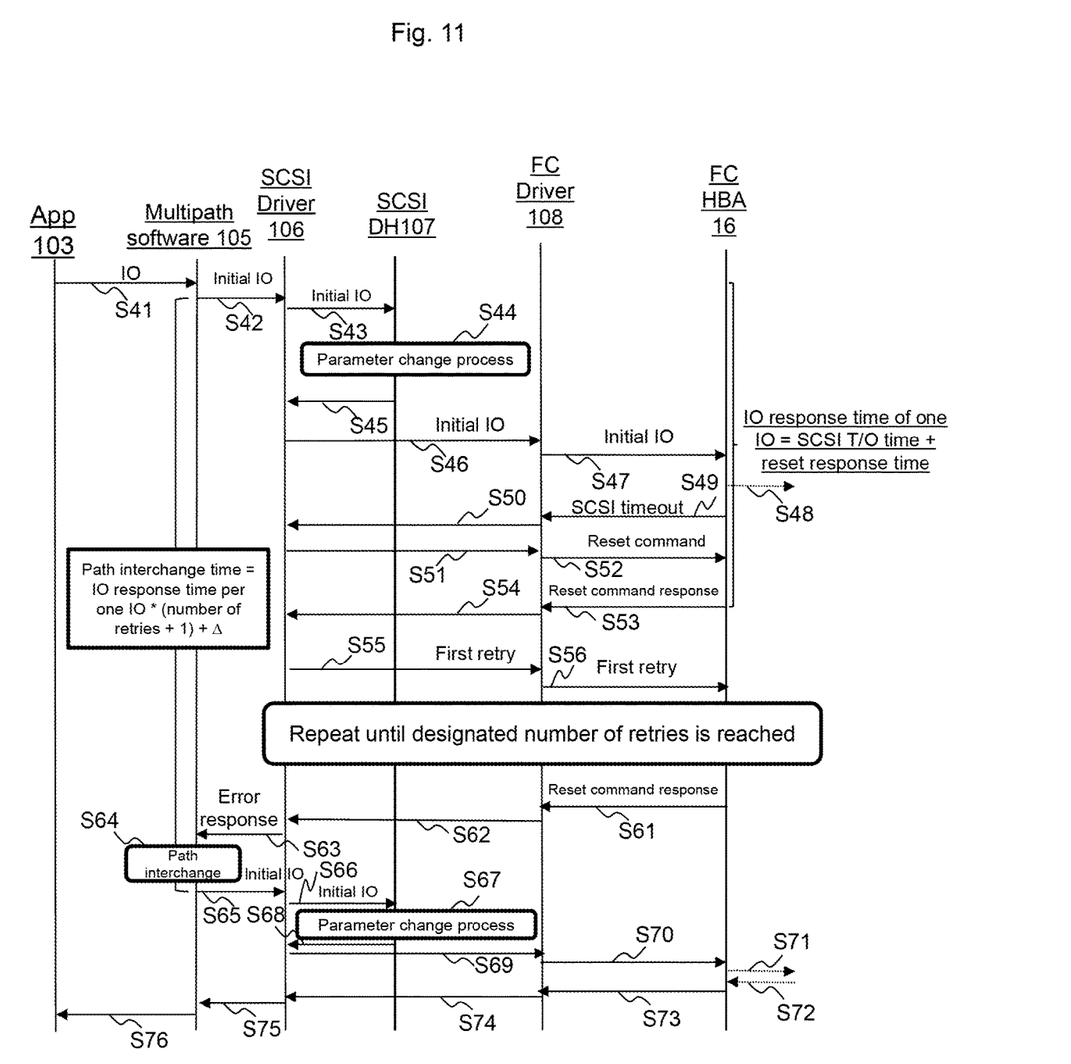
FIG. 11 is a sequence diagram of the IO process according to the embodiment.

Next, an example of the IO process will be described in detail.

FIG. 11 is a sequence diagram of an IO process according to the embodiment.

First, when the multipath software 105 is notified by the application 103 of an IO request having a certain LU 21 as an access destination (S41), the multipath software 105 determines a path for accessing the LU 21 that is the access destination (the access destination LU) and transmits an initial IO request to the SCSI driver 106 constituting the determined path (S42).

The SCSI driver 106 causes execution of the SCSI DH 107 to start (S43). The SCSI DH 107 executes the parameter change process (S44). Accordingly, the values of Retries and Jiffies_at_alloc in the command structure of the SCSI driver 106 are changed to values for causing retries to be executed, an upper limit of the retries being the SCSI number of retries corresponding to the access destination LU in the SCSI number-of-retries management table 120.

Next, the SCSI DH 107 notifies the SCSI driver 106 that the process has ended (S45).

The SCSI driver 106 transmits an initial request for access with respect to the access destination LU to the FC driver 108 (S46). The FC driver 108 transmits the initial request for access with respect to the access destination LU to the HBA 16 (S47). Next, the HBA 16 transmits an access request with respect to the access destination LU to the storage apparatus 20 (S48).

When the access destination LU cannot be accessed and a timeout time is reached, the HBA 16 notifies the FC driver 108 that a SCSI timeout has occurred (S49).

The FC driver 108 notifies the SCSI driver 106 that a SCSI timeout has occurred (S50).

The SCSI driver 106 notifies the FC driver 108 of a reset command for performing a reset (S51), and the FC driver 108 notifies the HBA 16 of the reset command (S52). The HBA 16 executes a reset process, and when the reset is finished, the HBA 16 transmits a reset command response to the FC driver 108 (S53) and the FC driver 108 transmits the reset command response to the SCSI driver 106 (S54). In this case, a time from step S42 to step S53 corresponds to one IO response time.

When the access destination LU cannot be accessed, the SCSI driver 106 repetitively executes retries until the number of actually executed retries equals the number of retries designated by the SCSI DH 107 (S55 to S62).

When the access destination LU could not be accessed despite the number of actually executed retries equaling the number of retries designated by the SCSI DH 107, the SCSI driver 106 transmits an error response to the multipath software 105 (S63).

When the multipath software 105 receives the error response, the multipath software 105 interchanges the path for accessing the access destination LU with another path (S64). In this case, a time from step S42 until step S64 is completed corresponds to a path interchange time.

Next, the multipath software 105 transmits, to the SCSI driver 106 of the new path, an initial IO request with respect to the path (S65). Next, steps S66 to S71 similar to steps S43 to S48 are executed.

As a result of step S71, when a normal response from the storage apparatus 20 is received (S72), the HBA 16 notifies the FC driver 108 of an access result (S73), the FC driver 108 notifies the SCSI driver 106 of the access result (S74), and the SCSI driver 106 notifies the multipath software 105 of the access result (S75). The multipath software 105 notifies the application 103 of the access result (S76).

As described above, with the IO process according to the present embodiment, when an access by a certain path cannot be performed, an interchange with a next path can be suitably performed in accordance with a path interchange time designated by the user.

It is to be understood that the present invention is not limited to the embodiment described above and that various modifications can be made in the invention without departing from the spirit and scope thereof.

For example, while respective path interchange times are configured for read and write in the embodiment described above, the present invention is not limited thereto and a common path interchange time may be configured for read and write. In addition, while a SCSI timeout time is configured by the user in the embodiment described above, the present invention is not limited thereto and a default value configured in advance may be used instead of having the user configure a SCSI timeout time.

What is claimed is:

1. A data processing apparatus which has a processor unit and which controls data access with respect to a prescribed logical unit, wherein the processor unit is configured to:
    perform, when data access by one path with respect to the logical unit is not completed, control for switching paths with respect to the logical unit;
    perform communication control in accordance with Small Computer System Interface (SCSI) with the logical unit by executing a SCSI driver;
    accept a path interchange time that is a time used as a reference for switching paths with respect to the logical unit;
    determine an upper limit number of retries in data access by the one path based on the path interchange time; and
    perform control so that an upper limit number of retries using the one path by the SCSI driver equals the determined upper limit number of retries.

2. The data processing apparatus according to claim 1, wherein the SCSI driver is configured to perform communication control according to a retry upper limit value that is an upper limit value of a number of retries in a path used in a configured access and a number of executed retries that is a number of retries having been executed, and the processor unit is configured to adjust the number of executed retries so as to equal the determined upper limit number of retries.

3. The data processing apparatus according to claim 1, wherein the SCSI driver is configured to determine a retry in a used path based on a total time of a command allocation time corresponding to a time from receiving a request for access to a moment at which a command can be transmitted and a timeout time of a specified number of SCSI commands, and the processor unit is configured to adjust the command allocation time so that the total time equals a time corresponding to the determined upper limit number of retries.

4. The data processing apparatus according to claim 1, wherein the processor unit is configured to:
    accept a path interchange time for read which is a path interchange time during a read with respect to the logical unit and a path interchange time for write which is a path interchange time during a write with respect to the logical unit;
    determine a number of retries during read, which is an upper limit number of retries during a read based on the path interchange time for read, and determine a number of retries during write which is an upper limit number of retries during a write based on the path interchange time for write; and
    control an upper limit number of retries by the SCSI driver during a read so as to equal the number of retries during read and control an upper limit number of retries by the SCSI driver during a write so as to equal the number of retries during write.

5. The data processing apparatus according to claim 1, wherein the processor unit is configured to:
    accept a timeout time with respect to one access by the SCSI driver; and
    determine the upper limit number of retries using the timeout time.

6. The data processing apparatus according to claim 1, wherein the processor unit is configured to:
    accept the path interchange time for each logical unit; and
    determine the upper limit number of retries for each logical unit.

7. The data processing apparatus according to claim 1, wherein the processor unit is configured to:
    determine the upper limit number of retries using a reset timeout time that is required to reset one access and the path interchange time.

8. The data processing apparatus according claim 1, wherein
    the SCSI driver is configured to cause the processor unit to execute a SCSI device handler, and
    the SCSI device handler is configured to cause the processor unit to determine an upper limit number of retries in an access by the one path based on the path interchange time, and perform control so that the upper limit number of retries using the one path by the SCSI driver equals the determined upper limit number of retries.

9. A data processing method to be used by a data processing apparatus which controls data access with respect to a prescribed logical unit, the data processing method comprising:
    performing, when data access by one path with respect to the logical unit is not completed, control for switching paths with respect to the logical unit;
    performing communication control in accordance with Small Computer System Interface (SCSI) with the logical unit by executing a SCSI driver;
    accepting a path interchange time that is a time used as a reference for switching paths with respect to the logical unit;
    determining an upper limit number of retries in data access by the one path based on the path interchange time; and
    performing control so that an upper limit number of retries using the one path by the SCSI driver equals the determined upper limit number of retries.

10. The data processing method according to claim 9, further comprising:
    using the SCSI driver to perform communication control according to a retry upper limit value that is an upper limit value of a number of retries in a path used in a configured access and a number of executed retries that is a number of retries having been executed; and
    adjusting the number of executed retries so as to equal the determined upper limit number of retries.

11. The data processing method according to claim 9, further comprising:
    determining a retry in a used path based on a total time of a command allocation time corresponding to a time from receiving a request for access to a moment at which a command can be transmitted and a timeout time of a specified number of SCSI commands; and adjusting the command allocation time so that the total time equals a time corresponding to the determined upper limit number of retries.

12. The data processing method according to claim 9, further comprising:
accepting a path interchange time for read which is a path interchange time during a read with respect to the logical unit and a path interchange time for write which is a path interchange time during a write with respect to the logical unit;
determining a number of retries during read, which is an upper limit number of retries during a read based on the path interchange time for read, and determining a number of retries during write which is an upper limit number of retries during a write based on the path interchange time for write; and
controlling an upper limit number of retries by the SCSI driver during a read so as to equal the number of retries during read and control an upper limit number of retries by the SCSI driver during a write so as to equal the number of retries during write.

13. The data processing method according to claim 9, further comprising:
accepting a timeout time with respect to one access by the SCSI driver; and
determining the upper limit number of retries using the timeout time.

14. The data processing method according to claim 9, further comprising:
accepting the path interchange time for each logical unit; and
determining the upper limit number of retries for each logical unit.

15. The data processing method according to claim 9, further comprising determining the upper limit number of retries using a reset timeout time that is required to reset one access and the path interchange time.

16. The data processing method according to claim 9, further comprising executing a SCSI device handler to cause a determination of an upper limit number of retries in an access by the one path based on the path interchange time, and a performance of control so that the upper limit number of retries using the one path by the SCSI driver equals the determined upper limit number of retries.

17. A non-transitory computer readable medium storing a data processing program to be executed by a computer constituting a data processing apparatus which controls data access with respect to a prescribed logical unit,
the computer being configured to perform, when data access by one path with respect to the logical unit is not completed, control for switching paths with respect to the logical unit, and perform communication control in accordance with Small Computer System Interface (SCSI) with the logical unit by executing a SCSI driver,
wherein the data processing program causes the computer to:
accept a path interchange time that is a time used as a reference for switching paths with respect to the logical unit;
determine an upper limit number of retries in data access by the one path based on the path interchange time; and
perform control so that an upper limit number of retries using the one path by the SCSI driver equals the determined upper limit number of retries.

18. The non-transitory computer readable medium according to claim 17, wherein the data processing program causes the computer to:
use the SCSI driver to perform communication control according to a retry upper limit value that is an upper limit value of a number of retries in a path used in a configured access and a number of executed retries that is a number of retries having been executed; and
adjust the number of executed retries so as to equal the determined upper limit number of retries.

19. The non-transitory computer readable medium according to claim 17, wherein the data processing program causes the computer to:
determine a retry in a used path based on a total time of a command allocation time corresponding to a time from receiving a request for access to a moment at which a command can be transmitted and a timeout time of a specified number of SCSI commands; and
adjust the command allocation time so that the total time equals a time corresponding to the determined upper limit number of retries.

20. The non-transitory computer readable medium according to claim 17, wherein the data processing program causes the computer to:
accept a path interchange time for read which is a path interchange time during a read with respect to the logical unit and a path interchange time for write which is a path interchange time during a write with respect to the logical unit;
determine a number of retries during read, which is an upper limit number of retries during a read based on the path interchange time for read, and determining a number of retries during write which is an upper limit number of retries during a write based on the path interchange time for write; and
control an upper limit number of retries by the SCSI driver during a read so as to equal the number of retries during read and control an upper limit number of retries by the SCSI driver during a write so as to equal the number of retries during write.

* * * * *